(12) United States Patent
Guan et al.

(10) Patent No.: US 9,128,205 B2
(45) Date of Patent: Sep. 8, 2015

(54) PROCESS FOR CREATING IMAGE GATHERS (71) Applicant: TOTAL E&P USA, INC., Houston, TX (US)

(72) Inventors: Huimin Guan, Houston, TX (US); Paul Williamson, Pau (FR); Francois Audebert, Pau (FR); Bertrand Duquet, Aberdeen (GB)

(73) Assignee: TOTAL E&P USA, INC., Houston, TX (US)

( * ) Notice: Subject to any disclaimer, the term of this patent is extended or adjusted under 35 U.S.C. 154(b) by 350 days.

(21) Appl. No.: 13/675,699

(22) Filed: Nov. 13, 2012

(65) Prior Publication Data

US 2014/0133275 A1 May 15, 2014

(51) Int. Cl.
*G01V 1/36* (2006.01)
*G01V 1/30* (2006.01)
*G01V 1/28* (2006.01)

(52) U.S. Cl.
CPC ............... *G01V 1/301* (2013.01); *G01V 1/303* (2013.01); *G01V 1/28* (2013.01); *G01V 1/362* (2013.01); *G01V 2210/51* (2013.01)

(58) Field of Classification Search
CPC ......... G01V 1/303; G01V 1/362; G01V 1/36; G01V 2210/51
USPC .............................................. 367/38, 50–53
See application file for complete search history.

(56) References Cited

U.S. PATENT DOCUMENTS

| 7,196,969 | B1 | 3/2007 | Karazincir |
| 2007/0203673 | A1 | 8/2007 | Sherrill et al. |
| 2012/0075954 | A1 | 3/2012 | Xu et al. |
| 2012/0176861 | A1 | 7/2012 | Abma et al. |

OTHER PUBLICATIONS

Prucha et al., "Angle-Domain common image gathers by wave equation migration", Stanford Exploration Project, Report 100, Apr. 20, 1999, pp. 101-113.*
International Search Report with Written Opinion issued in PCT/US2013/069882, dated Feb. 18, 2014 (9 pages).
J. Rickett et al., "Offset and Angle-Domain Common Image-Point Gathers for Shot•Profile Migration," Geophysics, vol. 67, No. 3, May-Jun. 2002, pp. 883-889.

(Continued)

*Primary Examiner* — Ian J Lobo (57) ABSTRACT

The process of obtaining seismic data includes deploying a seismic energy source and seismic receivers, actuating the source, and detecting seismic energy resulting therefrom at the receivers. The process further includes digitally sampling seismic energy detected at the receivers indexed with respect to time to form a plurality of traces and sorting the traces to form a plurality of shot gathers. In addition, the process includes applying a depth migration technique to the shot gathers to generate two images according to the cross-correlation imaging condition ($I_0$) and the gradient-based imaging condition ($I_1$) for each shot gather. A reflection angle ($\theta$) or a general domain parameter ($\alpha$) is computed at each subsurface position and the images are mapped according to the corresponding reflection angle or the general domain parameter to form common image gathers. Amplitude correction is applied to common image gathers and the images and common image gathers are stored on non-transitory computer-readable media.

6 Claims, 3 Drawing Sheets

(56) References Cited

OTHER PUBLICATIONS

C. Stolk et al., "Inverse Scattering of Seismic Data in The Reverse Time Migration (RTM) Approach," Proceedings of the Project Review, Geo-Mathematical Imaging Group, Purdue University, vol. 1, 2009, pp. 91-108.

"Common Image Gathers," Chapter 6, www.caam.rice.edu/~caam641/3DSI-chap6.pdf, SEG/2006.

Q. Zhang et al., "Direct Vector-Field Method to Obtain Angle-Domain Common-Image Gathers from Isotropic Acoustic and Elastic Reverse Time Migration," Geophysics, vol. 76, No. 5, Sep.-Oct. 2011, pp. WB135-WB149.

S. Xu et al., "3D Angle Gathers from Reverse Time Migration," Geophysics, vol. 76, No. 2, Mar.-Apr. 2011, pp. S77-S92.

R. Yan et al., "Angle Gather Extraction for Acoustic and Isotropic Elastic RTM," SEG San Antonio 2011 Annual Meeting, pp. 3141-3146.

Q. Zhang et al., "Angle Domain Common Image Gathers Extracted from Reverse Time Migrated Images in Isotropic Acoustic and Elastic Media," SEG San Antonio 2011 Annual Meeting, pp. 3130-3135.

T. Dickens et al., "RTM Angle Gathers Using Poynting Vectors," SEG San Antonio 2011 Annual Meeting, pp. 3109-3113.

K. Yoon et al., "3D RTM Angle Gathers from Source Wave Propagation Direction and Dip of Reflector," SEG San Antonio 2011 Annual Meeting, pp. 3136-3140.

W. Chang et al., "Elastic Reverse-Time Migration," Geophysics, vol. 52, No. 10, Oct. 1987, pp. 1365-1375.

M. Vyas et al., "Efficient RTM Angle Gathers Using Source Directions," SEG San Antonio 2011 Annual Meeting, pp. 3104-3108.

P. Sava et al., "Angle-Domain Common-Image Gathers by Wavefield Continuation Methods," Geophysics, vol. 68, No. 3, May-Jun. 2003, pp. 1065-1074.

\* cited by examiner

PROCESS FOR CREATING IMAGE GATHERS

BACKGROUND

1. Field of the Disclosure

The disclosure relates generally to the field of seismic data processing. In particular, methods of the disclosure relate to the extraction of common image gathers (CIGs) in the angle domain.

2. Description of the Related Art

Seismic surveying may be used to determine structures, compositions and fluid content of subsurface Earth formations. For instance, seismic surveying may be used to infer the presence of useful materials, such as oil and gas, in subsurface Earth formations. In seismic exploration for oil and gas, the Earth's subsurface may be illuminated by a seismic source at or near the surface of the Earth. As used herein, the term "illumination" means at least that seismic energy from the source is incident on a subsurface point. Scattered or reflected energy from the illuminated subsurface point may be recorded by one or more sensors or receivers deployed for detecting seismic energy originating from the source. Impedance boundaries are frequently located at boundaries between Earth formations having different composition. Waves propagate into the Earth and may be reflected from the impedance boundaries and travel upwardly until being detected by seismic sensors. Structure and composition of the Earth's subsurface may be inferred from the travel time of the reflected seismic energy, from the geographic position of the source and each of the sensors, and from the amplitude and phase of the various frequency components of the reflected seismic energy. Reflected waves are typically recorded by a receiver array. The receivers can be positioned on the Earth's surface, on the ocean bottom, towed near a water surface, or in a well and can be arranged in any geometrical pattern in two or three dimensions. In a seismic survey, the source and receiver array are often relocated to a number of overlapping areas in order to uniformly illuminate the subsurface in a region.

Figure 1:
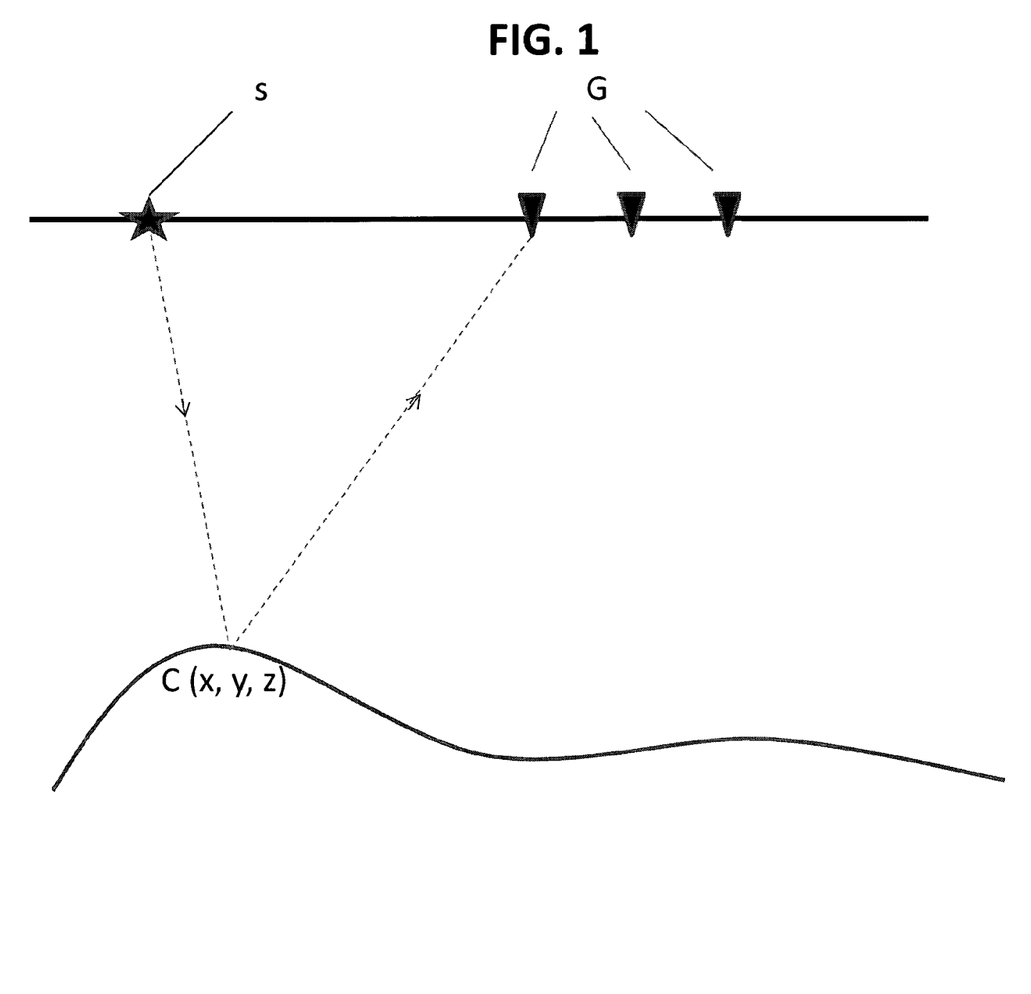
FIG. 1 is a schematic diagram illustrating the acquisition of seismic data.

FIG. 1 illustrates diagrammatically an example of a survey of seismic data with a source S of seismic waves and an array of receivers G. It also shows a point C of the subsurface which is assumed to contribute to the signal sensed by one of the receivers G. The horizontal coordinates of point C of the subsurface are denoted by x, y (or only one spatial coordinate if 2D imaging instead of 3D imaging is considered), while its depth is denoted by z. FIG. 1 also provides a simplified representation (dashed lines) of the propagation of seismic waves from the source S to the point C and from the point C to the receiver G. The waves may be refracted at discontinuities of the geological layers where the impedance changes and reflected or diffracted at different positions including that of point C.

The data recorded in a seismic survey include, for each shot from a source S and for each receiver G, a seismic trace which is a time series of the signal sensed by the receiver G. The traces for a number of shots must be transformed to provide an image of the subsurface which will be the result of stacking or integrating a large amount of information. An important step of the transformation is the migration which consists in processing the data with respect to a model such that the data received at the surface are mapped into subsurface to represent the reflectivity of the discontinuities in the model. The model is usually a map of the propagation velocity of the acoustic waves in the subsurface. This model is not known a priori and it is a main challenge of many seismic imaging technologies to determine a model that will properly account for the field data.

In pre-stack depth migration (PSDM) methods, migrated data are computed for each shot using the velocity model and arranged in an output cube containing migrated values associated with positions in the subsurface. The cubes obtained for different shots may then be stacked and/or analyzed to form Common Image Gathers (CIGs) and check consistency of the model. The model may be corrected and the process iterated until a satisfactory image is obtained.

CIGs are popular tools for evaluating the migration velocity field, for subsurface attribute analysis, and for imaging enhancement. CIGs are created either during the migration process or from data extracted from the output cubes of migration, sorted in a convenient way for analysis so as to check the velocity model. A CIG is a bi-dimensional data structure defined for a given horizontal position (x, y), with a first axis representing the depth z and a second axis representing a domain parameter a referred to for sorting the multiple images of the migration process. It contains reflectivity values obtained from the output cubes resulting from the migration, forming an image which can be analyzed to check and/or correct the velocity model. Examples of commonly used domain parameters a include the surface offset, subsurface offset or the scattering or reflection angle at the subsurface position (x, y, z), etc. Because CIGs in the scattering angle domain closely represent the angle-dependent reflectivity of subsurface reflectors, they are the most useful for velocity model analysis, subsurface attribute analysis and image improvement in complex media.

The computation of CIGs is not simple in all wave-field extrapolation methods and it can be very expensive for reverse-time migration (RTM), which by itself is already a process requiring a large amount of computation time and computer memory. RTM is a two-way migration solution which can accurately describe wave propagation in complex media. It is increasingly used in seismic exploration by virtue of advances in computer power and programming.

In "Offset and angle-domain common image-point gathers for shot-profile migration", Geophysics, Vol. 67, No. 3, 2002, pp. 883-889, J. Rickett and P. Sava established the notion of subsurface offset CIGs which requires the extension of the imaging condition through the computation of the correlation function along the spatial horizontal dimension. This type of gather is the most common way to output wave-equation-based migration images. It corresponds to velocity updating techniques based on focusing analysis, which look for the highest correlation at zero-time lag and/or zero-offset, and only small values elsewhere. A method has been proposed to derive scattering angle CIGs from subsurface offset CIGs by applying local slant stack. A similar method has also been proposed to extend the imaging condition in the time domain and to convert the time-shifted image gathers to CIGs into the angle domain.

The local offset and time lag gathers are formed during the migration process, and significant computer memory is required to store the intermediate CIGs. For 3-D cases, a 5-D array is necessary where local offsets in both x and y directions are used; if all space and time lags are included, a 7-D array is necessary. While applying an imaging condition may normally require only a small proportion of the memory needed in the whole computation of RTM, the memory requirements may increase dramatically if a large number of lags are computed in more than one dimension. Another major part of the computation cost is the use of slant stacking to extract angle gathers from local offset (or time lag) gathers. While local slant stack may be an efficient procedure in 2-D, the gather conversion is very complex in 3-D. While potentially less expensive to derive angle gathers from CIGs with only non-zero time lag the resolution of angle gathers from this approach is not as good as those provided by local offset gathers. Furthermore, this methodology does not provide azimuth information for 3-D cases.

In another example, angle domain CIGs can be formed during the migration process by wave field decomposition. Source and receiver wave fields in the frequency domain are transformed into the wave-number domain, cross-correlation is applied between each component of the source wave field and that of the receiver wave field, and then the resulting partial images are mapped and binned according to the corresponding azimuth and reflection angle to form angle-domain CIGs. Wave field decomposition can be performed in the time and space domain by local slant stack as well. A 4-D spatial/temporal Fourier transform is applied to both the source and receiver wave fields to convert them into frequency wave-number domain. The procedure to generate angle dependent partial images typically involves an expensive multi-dimensional convolution of seven loops. A 3-D inverse spatial Fourier transform is applied to the angle dependent image formed initially in the wave-number domain. Spatial windowing, ALFT (anti-aliasing Fourier transform) and the facts that the norm of slowness in a small window in a homogeneous media varies only in a small range and the seismic events are closer to linear help to reduce the cost to make the approach feasible in practice. The cost of this migration has been estimated to be 5-10 times the cost of the RTM itself. Besides intensive computation, this method requires significant disk space to store the wave fields at all time steps and significant memory to store the 5-D angle gathers.

In still another example, instead of wave-field decomposition, the direction of wave propagation is computed at each time step, partial images are computed together with the corresponding angles, and then mapped accordingly into angle gathers. This approach determines the dominant direction of wave propagation during the migration process. The additional computation cost is caused by computing the Poynting vectors of the wave fields, which is similar to that of a RTM. However when the wave field is complex it is difficult to detect the direction of wave propagation accurately.

SUMMARY

A process is disclosed. The process includes obtaining seismic data by deploying a seismic energy source and seismic receivers, actuating the source, and detecting seismic energy resulting therefrom at the receivers. The process further includes digitally sampling seismic energy detected at the receivers indexed with respect to time to form a plurality of traces and sorting the traces to form a plurality of shot gathers. In addition, the process includes applying a depth migration technique to the shot gathers to generate two images according to the cross-correlation imaging condition ($I_0$) and the gradient-based imaging condition ($I_1$) for each shot gather. A reflection angle ($\theta$) or a general domain parameter ($\alpha$) is computed at each subsurface position and the images are mapped according to the corresponding reflection angle or the general domain parameter to form common image gathers. Amplitude correction is applied to common image gathers, and the images and common image gathers are stored on non-transitory computer-readable media.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In certain embodiments of the present disclosure, the method includes obtaining seismic data by deploying a seismic energy source and seismic receivers, actuating the source, and detecting seismic energy resulting therefrom at the receivers. The seismic energy is detected and digitally sampled at the receivers, and indexed with respect to time to form traces. The traces may then be sorted to form a plurality of shot gathers. A depth migration technique may then be applied to the shot gathers to generate two images according to the cross-correlation imaging condition ($I_0$) and the gradient-based imaging condition ($I_1$) for each shot gather, i.e., one with and one without the reflection or scattering angle information are generated for each shot gather in the migration process.

Depth migration may be applied to seismic data in order to convert it from traces in time, additionally indexed by the coordinates of source and receiver locations to a subsurface image in space coordinates, including depth. This method may require a velocity model. Any suitable depth migration technique may be used for the present disclosure. Non-limiting depth migration techniques include reverse time migration (RTM) and wave-equation migration.

Reflection angles or general domain parameters, which are functions of reflection angles, may then be computed via a division between these two images. Pre-stack images may then be mapped onto angle domain or the domain of general domain parameters to form CIGs. Amplitude correction may be applied afterwards. Amplitude correction is a process applied to migration images or image gathers to make the amplitude of the images or image gathers proportional to the reflectivity of the subsurface reflector, where possible.

In certain embodiments, the present disclosure may be applied to isotropic media. In certain other embodiments, the present disclosure may be applied to anisotropic media. In certain embodiments, the angle gathers keep the high resolution of the original images.

In certain embodiments of the present disclosure, the following algorithms may be used. As disclosed in Stolk, C. C., M. V. De Hoop and T. J. P. M. OP'T Root, 2009, Inverse scattering of seismic data in the reverse time migration (RTM) approach, Proceedings of the Project Review, Geo-Mathematical Imaging Group, Purdue University, Vol. 1, 91-108, which is herein incorporated by reference in its entirety, based on an inverse scattering formulation, an imaging condition for RTM is $$I(\vec{x}) = \frac{i}{\pi} \int_R \frac{1}{\omega^3 |p_s(\vec{x},\omega)|^2} \sum_{j=0}^{n} (k_{js} k_{jr} \overline{p}_s(\vec{x},\omega) p_r(\vec{x},\omega)) d\omega \quad (1)$$

in which $\overline{p}_s(\vec{x},\omega)$ is the complex conjugate of the source wave field; $p_r(\vec{x},\omega)$ is the receiver wave field; $k_{0s}=k_{0r}=\omega/c$, $\omega$ is the circular frequency, c is the phase velocity of wave propagation; and $k_{js}$ and $k_{jr}$ (j=1, 2, 3) are the components of wave number in j direction for the source and receiver wave fields respectively, n is the number of spatial dimension, z denotes an image point.

Equation (1) is equivalent to $$I(\vec{x}) = \quad (2)$$
$$\frac{i}{\pi} \int_R \frac{1}{\omega^3 |p_s(\vec{x},\omega)|^2} \left( \frac{\omega^2}{c^2(\vec{x})} \overline{p}_s(\vec{x},\omega) p_r(\vec{x},\omega) - \nabla \overline{p}_s(\vec{x},\omega) \nabla p_r(\vec{x},\omega) \right) d\omega$$

Ignoring source-side illumination compensation, the imaging condition has a simpler form as follows.

$$I(\vec{x}) = \int \int_R \left( \frac{\omega^2}{c^2(\vec{x})} \overline{p}_s(\vec{x},\omega) p_r(\vec{x},\omega) - \nabla \overline{p}_s(\vec{x},\omega) \nabla p_r(\vec{x},\omega) \right) d\omega \quad (3)$$

$I(\vec{x})$ can be separated into two parts:

$$I(\vec{x}) = I_0(\vec{x}) + I_1(\vec{x}) \quad (4)$$

$$I_0(\vec{x}) = \int_R \frac{\omega^2}{c^2(\vec{x})} \overline{p}_s(\vec{x},\omega) p_r(\vec{x},\omega) d\omega \quad (5)$$

$$I_1(\vec{x}) = \int_R -\nabla \overline{p}_s(\vec{x},\omega) \nabla p_r(\vec{x},\omega)) d\omega \quad (6)$$

The imaging condition presented in Equation (5) is referred to as the cross-correlation imaging condition, while the imaging condition presented in Equation (6) is referred to as the gradient-based imaging condition. Defining $\theta(\vec{x})$ as the angle between the source and receiver wave-number vectors, for isotropic case, equations (5) and (6) may be rewritten as $$I_0(\vec{x}) = \int_R k^2 \overline{p}_s(\vec{x},\omega) p_r(\vec{x},\omega) d\omega \quad (7)$$

$$I_1(\vec{x}) = \int_R -\nabla \overline{p}_s(\vec{x},\omega) \nabla p_r(\vec{x},\omega)) d\omega \quad (8)$$
$$= \int_R k^2 \cos\theta \overline{p}_s(\vec{x},\omega) p_r(\vec{x},\omega) d\omega$$

In which, $k=\omega/c$, is the wave number. Equation (7) is similar to that of the conventional cross-correlation imaging condition, and it is proportional to the cross-correlation of the first-order derivatives with respect to time of the source and receiver wave fields. The local reflection angle can be derived as $$\theta(\vec{x}) = \cos^{-1}(I_1/I_0 - 1) = \cos^{-1}(I_1 * I_0) \quad (9)$$

Equations (3)-(6) are extended to anisotropic media, such as the transverse isotropic media with a vertical symmetry axis (VTI), the transverse isotropic media with a tilted symmetry axis (TTI), the orthorhombic anisotropic media etc. by replacing c with $c_0$, the phase velocity along the symmetry axis. It can be derived that $$I_1/I_0 = \frac{c_0^2}{c_s c_r} \cos(\theta) \quad (10)$$

In which, $c_s$ and $c_r$ are the phase velocities of the source and receiver wave fields, respectively. The right side of the equation, $$\frac{c_0^2}{c_r c_s} \cos(\theta),$$

is referred to as the general domain parameter a for common image gathers. The division process comprises minimizing a cost function defined by a reflection angle and local values of images generated by using the imaging conditions $I_1$ and $I_0$ in a neighbourhood of each subsurface position.

For isotropic media, image I can be derived by applying the Laplacian operator to the image obtained by cross correlating the source and receiver wave field:

$$I_2(\vec{x}) = \int_0^{t_{max}} S(\vec{x},t) R(\vec{x},t_{max}-t) dt \quad (11)$$

In which S and R are the source and receiver wave field in the time and space domain, respectively; $t_{max}$ is the maximum length of time of the shot gather being migrated. A Laplacian filter is applied to the image:

$$\Delta I_2(\vec{x}) = \nabla \cdot \nabla I_2(\vec{x}) \quad (12)$$

The derivative operators are permuted with the integration in time and derived under the integral sign:

$$\Delta I_2(\vec{x}) = \int_0^{t_{max}} [\Delta S(\vec{x},t) R(\vec{x},t_{max}-t) + 2\nabla S(\vec{x},t) \cdot \nabla R(\vec{x},t_{max}-t) + S(\vec{x},t) \Delta R(\vec{x},t_{max}-t)] dt \quad (13)$$

Both fields obey the wave equation:

$$\begin{cases} \Delta S(\vec{x}, t) = \dfrac{1}{c(\vec{x})^2} \dfrac{\partial^2 S(\vec{x}, t)}{\partial t^2} \\ \Delta R(\vec{x}, t_{max} - t) = \dfrac{1}{c(\vec{x})^2} \dfrac{\partial^2 R(\vec{x}, t_{max} - t)}{\partial t^2} \end{cases} \quad (14)$$

Considering:

$$\dfrac{\partial^2}{\partial t^2} S(\vec{x}, t) R(\vec{x}, t_{max} - t) + S(\vec{x}, t) \dfrac{\partial^2}{\partial t^2} R(\vec{x}, t_{max} - t) = \quad (15)$$

$$\dfrac{\partial^2}{\partial t^2} (S(\vec{x}, t) R(\vec{x}, t_{max} - t)) - 2 \dfrac{\partial}{\partial t} S(\vec{x}, t) \dfrac{\partial}{\partial t} R(\vec{x}, t_{max} - t)$$

an integration by parts is performed of the time integral:

$$\int_0^{t_{max}} \dfrac{1}{c(\vec{x})^2} \left( \dfrac{\partial^2}{\partial t^2} S(\vec{x}, t) R(\vec{x}, t_{max} - t) + S(\vec{x}, t) \dfrac{\partial^2}{\partial t^2} R(\vec{x}, t_{max} - t) \right) dt = \quad (16)$$

$$\dfrac{1}{c(\vec{x})^2} \dfrac{\partial}{\partial t} (S(\vec{x}, t) R(\vec{x}, t_{max} - t)) \Big|_0^{t_{max}}$$

$$+ \int_0^{t_{max}} \dfrac{1}{c(\vec{x})^2} 2 \dot{S}(\vec{x}, t) \dot{R}(\vec{x}, t_{max} - t) dt$$

The first term on the right side of Equation 14 is zero in the embodiments of the present disclosure. Applying Equation (12) and (14) to Equation (13):

$$-\dfrac{1}{2} \Delta I_2(\vec{x}) = \quad (17)$$

$$-\int_0^{t_{max}} \left[ \dfrac{1}{c(\vec{x})^2} \dot{S}(\vec{x}, t) \dot{R}(\vec{x}, t_{max} - t) + \vec{\nabla} S(\vec{x}, t) \cdot \vec{\nabla} R(\vec{x}, t_{max} - t) \right] dt$$

The right-hand side of equation (17) is equivalent to the imaging condition presented in Equation (3). The equivalence allows the computation of I by applying the Laplacian operator to $I_2$.

In certain embodiments of the present disclosure, the computation cost added to the migration process for isotropic media is minimal. For anisotropic media, the computation cost increases by less than one time of the migration cost due to the computation of the gradients of both the source and receiver wave fields.

Equation (9) or (10) may only be accurate when an image point is illuminated at most once by a given shot. In certain embodiments, such as for a complicated model, this condition may not be fulfilled; if acoustic/elastic waves arrive at a point in the subsurface from a given shot at two or more distinct times and/or from two or more directions, Equation (9) or (10) may not be accurate. To alleviate the interference of such multiple arrivals, every image point may be decomposed into images at different dip angles and the reflection angle may be computed for each dip component. Then the individual components are mapped to different reflection angle bins. Such a process separates multiple arrivals contributing to an image point with different dip angles. Those multiple arrivals contributing to an image point with the same dip angle are not separated, so, in certain embodiments, the computed reflection angle can be a weighted average, close to that of the most energetic arrival among them.

In certain embodiments, Equation (9) or (10) may be implemented by:
(1) For a shot gather, applying RTM and generating two images according to the imaging conditions, $I_1$ and $I_0$; The images according to $I_1$ and $I_0$ are in the (x,y,z) domain.
(2) At each image point, decomposing both images from the (x,y, z) domain to the (x, y, z, p) domain, in which p represents the reflector dip angle.
(3) Computing the reflection angle with Eq. (9) or the general domain parameter a with Eq. (10) for each p-component at an image point followed by mapping the images according to the corresponding reflection angle or general domain parameter, and stacking every component in each reflection angle or general domain parameter bin. In certain embodiments, equation (9) and (10) are implemented by least-squares division. In other embodiments, simple division may be used.
(4) Repeating procedure (1)-(3) for every shot, stacking contributions from all shots.
(5) At each image point, mapping the source illumination similarly according to the computed reflection angle to the angle domain or according to the general domain parameter to the a domain for every shot, and stacking contributions from all shots to form gathers of source illumination.
(6) Applying illumination compensation to the common image gathers by, for each angle or α bin at each position, dividing the stacked image amplitude from step (4) by the corresponding stacked illumination from step (5).

In certain other embodiments, Equation (9) or (10) may be implemented by:
(1) For a shot gather, applying RTM and generating two images according to the imaging conditions $I_1$ and $I_0$.
(2) At each image point, decomposing the two images in (x, y, z) domain to (x, y, z, p) domain.
(3) Applying the Hilbert transform to each trace from both images in the (x,y,z,p) domain, computing the reflection angle with Equation (9) or the general domain parameter a with Equation (10) for each p-component, followed by mapping the images according to the corresponding reflection angle or domain parameter a, and stacking all contributions to each reflection angle bin or a bin. In certain embodiments, least-squares division may be used to implement equation (9) and (10). In other embodiments, simple division may be used.
(4) Repeating procedure (1)-(3) for every shot, stacking contributions from all shots.
(5) At each image point, mapping the source illumination similarly according to the computed reflection angle to the angle domain or according to the general domain parameter to the a domain for every shot, and stacking contributions from all shots to form gathers of source illumination.
(6) Applying illumination compensation to the common image gathers by dividing the value of the stacked image amplitude by the corresponding value of stacked illumination.

In certain other embodiments, Equation (9) or (10) may be implemented by computing the reflection angle or the general domain parameter with a weighted average of the values produced in the previous two implementations.

In certain embodiments, $I_1$ and $I_0$ are in the (x,y,z) domain. As one of ordinary skill in the art with the benefit of this disclosure will realize, $I_1$ and $I_0$ could also be represented in other domains.

As indicated above, in certain embodiments, illumination compensation may be applied to the common image gathers. In illumination compensation, the migration image is normalized by source-side illumination, which is defined as the auto-correlation of the source wave field and measures the strength of energy from the seismic source at subsurface.

In certain embodiments, before the step of computing the reflection angle or the general domain parameter, the images may be decomposed into reflector dip angle domain by local slant stack or τ-p transform, herein r represents depth. In certain embodiments, after computing the reflection angle or the general domain parameter, the source illumination is decomposed by mapping to the reflection angle domain. Illumination compensation may then be applied to the common image gathers by any suitable methods.

The images, source illumination, and common image gathers may then be stored on non-transitory computer-readable media or printed.

Figure 2:
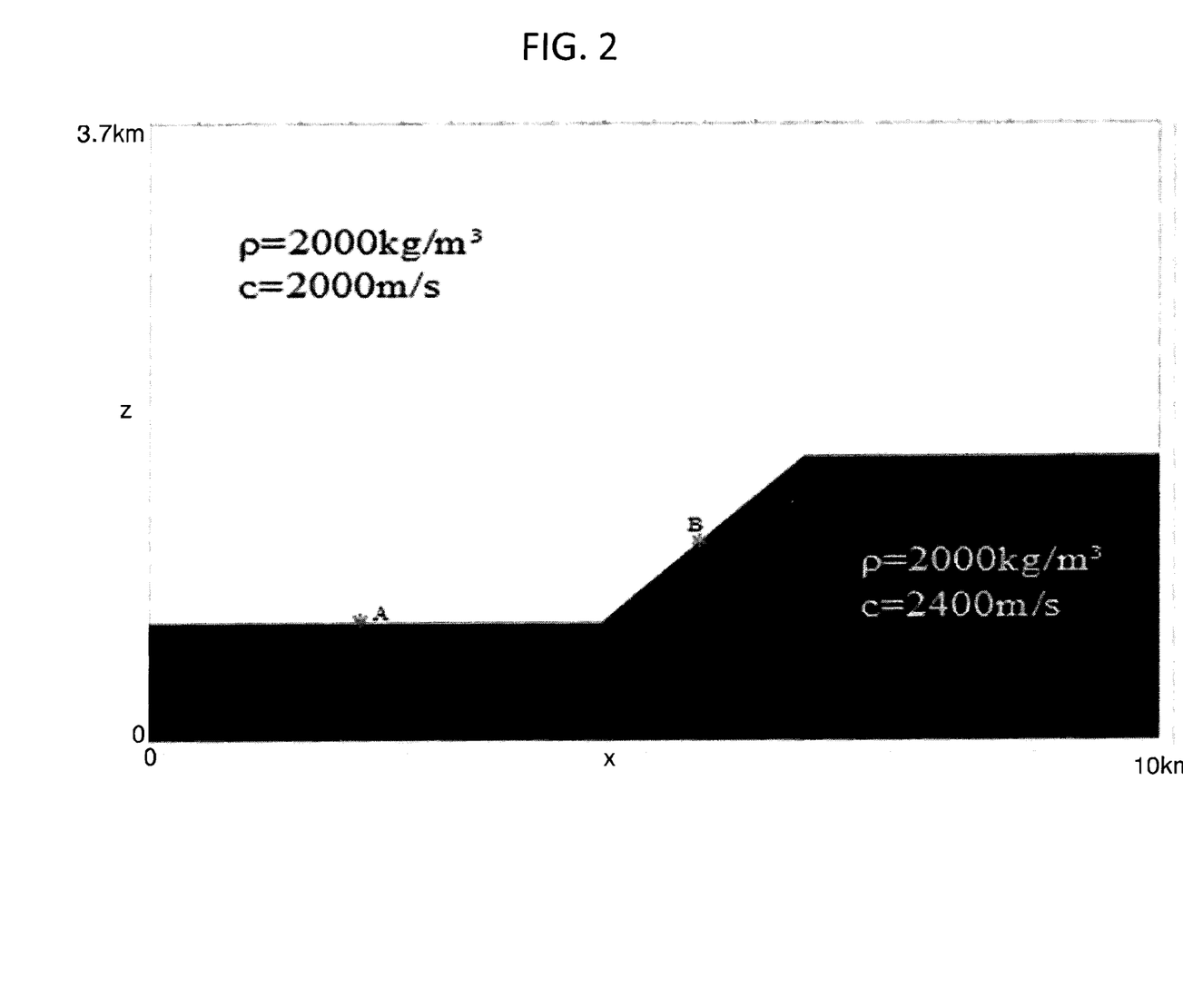
FIG. 2 is a graphical depiction of a layered model with one reflector in accordance with one embodiment of the present disclosure.

FIGS. 2 and 3A-C are indicative of the process used in at least one embodiment of the present disclosure. FIG. 2 is a preliminary graphical depiction of a layered model with one reflector. In the model, the reflection point can be point A, which is located on a portion of the reflector without a dip angle. The axes for the model are x[Δx] and z[Δz]. Density of the upper media is 2000 kg/m³ with an assumed velocity of 2000 m/s. Density of the lower media is 2000 kg/m³ with an assumed velocity of 2400 m/s.

Figure 3A:
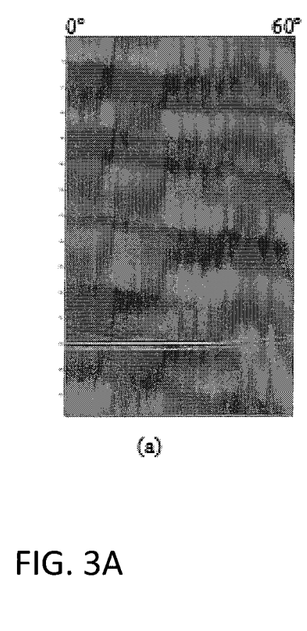
FIG. 3A is a common image gather at point A in FIG. 2 at correct velocity.
Figure 3B:
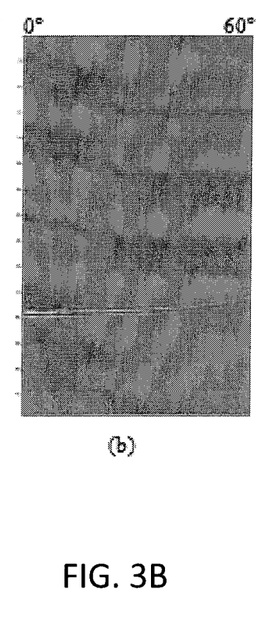
FIG. 3B is a common image gather at point A in FIG. 2 at velocity 10% smaller than correct velocity.
Figure 3C:
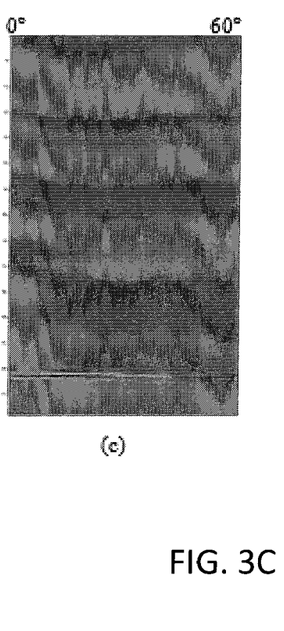
FIG. 3C is a common image gather at point A in FIG. 2 at velocity 10% larger than correct velocity.

FIGS. 3A-C show example CIGs developed in accordance with one embodiment of the present disclosure. FIG. 3A depicts the CIGs when the model has the correct velocity. FIG. 3B depicts the CIGs when the velocity is 10% smaller than the correct velocity with FIG. 3C depicting the CIGS when the velocity is 10% larger than the correct velocity. The amount of curvature of the line shown in FIGS. 3B and 3C allows adjustment of the model velocity to attain the correct velocity.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112, paragraph 6 for any limitations of any of the claims herein, except for those in which the claim expressly uses the word "means" together with an associated function.

The invention claimed is:

1. A process comprising:
  obtaining seismic data by deploying a seismic energy source and seismic receivers, actuating the source, and detecting seismic energy reflected from a plurality of subsurface positions resulting therefrom at the receivers;
  forming a plurality of traces by digitally sampling the seismic energy detected at the receivers and indexing the seismic energy with respect to time;
  sorting the traces to form a plurality of shot gathers;
  applying a depth migration technique to the shot gathers to generate two images according to the cross-correlation imaging condition ($I_0$) and the gradient-based imaging condition ($I_1$) for each shot gather;
  converting the images to reflector dip angle domain;
  computing a reflection angle (θ) at each subsurface position, wherein the reflection angle at at least one subsurface position corresponding to an image point $\vec{x}$ defines a local reflection angle ($\theta(\vec{x})$) computed using the following formula:

$$\theta(\vec{x}) = \cos^{-1}(I_1/I_0);$$

mapping the images according to the corresponding reflection angle to form common image gathers;
  transforming the images to space domain;
  applying amplitude correction to common image gathers; and
  storing the images and common image gathers on non-transitory computer-readable media.

2. The process of claim 1, wherein the step of applying a depth migration technique is performed using reverse-time migration.

3. The process of claim 1, further comprising, after the step of computing a reflection angle (θ), the steps of:
  mapping the source illumination to the reflection angle domain; and
  applying illumination compensation to common image gathers.

4. A process comprising:
  obtaining seismic data by deploying a seismic energy source and seismic receivers, actuating the source, and detecting seismic energy reflected from a plurality of subsurface positions resulting therefrom at the receivers;
  forming a plurality of traces by digitally sampling the seismic energy detected at the receivers and indexing the seismic energy with respect to time;
  sorting the traces to form a plurality of shot gathers;
  applying a depth migration technique to the shot gathers to generate two images according to the cross-correlation imaging condition ($I_0$) and the gradient-based imaging condition ($I_1$) for each shot gather;
  converting the images to reflector dip angle domain;
  computing a general domain parameter a at each subsurface position, wherein a general domain parameter is computed using the following formula:

$$\alpha = \frac{c_0^2}{c_s c_r} \cos(\theta)$$
  $$= I_1/I_0$$

wherein $c_0$ is a phase velocity along a symmetry axis, and $c_s$ and $c_r$ are a phase velocities of the source and receiver wave fields respectively;
  mapping the images according to the corresponding general domain parameter to form common image gathers;
  transforming the images to space domain;

applying amplitude correction to common image gathers; and storing the images and common image gathers on non-transitory computer-readable media.

5. The process of claim 4, wherein the step of applying a depth migration technique is performed using reverse-time migration.

6. The process of claim 4, further comprising, after the step of computing a general domain parameter ($\alpha$), the steps of:

mapping the source illumination to the reflection angle domain; and applying illumination compensation to common image gathers.

* * * * *